United States Patent Office 3,707,546
Patented Dec. 26, 1972

3,707,546
PROCESS FOR PREPARING DODECANEDINITRILE
David Arthur Klein, Wilmington, Del., assignor to E. I. du Pont de Nemours and Company, Wilmington, Del.
No Drawing. Filed Apr. 2, 1971, Ser. No. 130,545
Int. Cl. C07c *121/10*
U.S. Cl. 260—465.2  3 Claims

ABSTRACT OF THE DISCLOSURE

Dodecanedinitrile is prepared from dodecanedioic acid by catalyzed reaction with ammonia, using dodecanedinitrile as the reaction solvent.

BACKGROUND OF THE INVENTION

This invention relates to the preparation of dodecanedinitrile by catalyzed reaction with ammonia in the presence of dodecanedinitrile, which is used as the reaction solvent. Dodecanedinitrile is useful as a high-boiling, stable solvent and may be used in the preparation of dodecamethylene diamine, which is useful in the synthesis of polyamides.

The production of certain aliphatic dinitriles by catalyzed reaction of aliphatic dicarboxylic acids with ammonia has been described in the prior art. U.S. Pat. 2,132,849 to Greenewalt shows the preparation of sebaconitrile by reaction of sebacic acid with ammonia in the presence of ammonium molybdate; U.S. Pat. 2,273,633 to Fluchaire et al. shows the preparation of adiponitrile by reaction of adipic acid and gaseous ammonia; and U.S. Pat. 3,299,116 to Romani et al. shows the use of adiponitrile as solvent in the reaction of adipic acid and ammonia to form adiponitrile. These patents do not suggest the method of producing dodecanedinitrile described herein in view of the excellent yields and other advantages obtained therewith. The method of the latter patent, in particular, requires large amounts of ammonia (e.g., 5–14 moles excess ammonia per mole of adipic acid) and also requires recycle of a considerable quantity of partially converted material in order to get the yields reported. It has been found that the dodecanedioic acid system has greater stability and reactivity, allowing complete conversion to dodecanedinitrile with a minimal amount of ammonia (e.g., 0.5 to 1.0 mole excess ammonia per mole of diacid) and retention time. Extended reaction time or the alternative recycle of partially converted products is therefore avoided with the process of the invention.

DESCRIPTION OF THE INVENTION

The invention is a process for producing dodecanedinitrile comprising contacting a solution containing dodecanedioic acid and dodecanedinitrile with ammonia. Preferably, the solution contains from 0.3 to 20 parts dodecanedinitrile per part of dodecanedioic acid, by weight. A range of from 1 to 1.5 parts of dodecanedinitrile per part of dodecanedioic acid, by weight, is particularly preferred. In practice, the solution consists essentially of a catalyst and dodecanedinitrile and dodecanedioic acid in the above-described proportions. The solution may be contacted with ammonia by bubbling the gaseous ammonia through the solution or by other means. A suitable amount of ammonia is from about 0.2 to 3.0 moles excess ammonia per mole of dodecanedioic acid, with 0.5 to 1.0 preferred (i.e., 0.1 to 1.5 moles excess ammonia per equivalent of diacid, with 0.25 to 0.5 preferred). Greater or lesser amounts may, of course, be used depending on the degree of conversion and reaction rate desired.

The reaction may be carried out under a pressure of 0.5 to 10 atmospheres, with one atmosphere preferred.

A suitable temperature range is from 200–450° C. The reaction temperature is preferably allowed to climb from a low temperature to a final temperature between 315–345° C.

The catalyst may be any material that will promote the dehydrative amidation reaction between the dodecanedioic acid and the ammonia. Non-volatile acids and their salts and organic esters (e.g., $H_3PO_4$, $BPO_4$, sodium and potassium phosphates, phosphate esters, $H_2SO_4$, and sulfonic acids) are suitable for this purpose. Orthophosphoric acid ($H_3PO_4$) and salts thereof, including $KH_2PO_4$, $K_2HPO_4 \cdot 3H_2O$, $Na_3PO_4 \cdot 12H_2O$, and $BPO_4$, are particularly preferred. The catalyst may be present in an amount of 0.1–10% by weight, based on the weight of dodecanedioic acid, with 0.2–0.5% preferred.

Due to the high reactivity of dodecanedioic acid with ammonia and the stability of dodecanedinitrile in the system, the process is adaptable to being conveniently carried out continuously or batchwise with continuous addition of ammonia. Use of dodecanedinitrile as the reaction solvent allows attainment of sufficiently high reaction temperatures to drive the reaction to completion while efficiently removing gaseous reaction by-products including product water and any traces of lower-boiling decarboxylated by-products. Since conversion is complete, even though a relatively short reaction time and a minimal amount of ammonia are used, and most side-products are removed during reaction, the desired dodecanedinitrile may be removed from the reaction vessel by simple distillation, rather than careful fractionation, to give pure product in high yield. Should operation at less-than-complete conversion be desirable (e.g., in a continuous reactor), the product may be fractionally distilled and the incompletely converted carboxyl-containing fractions used as solvent in subsequent dehydrative amidations.

The process of the invention is illustrated, but is not intended to be limited by the following examples:

EXAMPLE 1

A 5 l. round-bottom three-neck flask, equipped with a thermometer, a nitrogen inlet and an ammonia gas inlet is connected to an air-cooled, one-plate still which in turn is connected to a receiver. The receiver is connected to two ice-cooled traps. The flask is charged with a mixture of 1200 gm. (5.217 mole) of dodecanedioic acid, 1200 gm. (6.25 mole) of dodecanedinitrile and 6.0 gm. of 85% phosphoric acid catalyst. A slow stream of nitrogen and ammonia is passed into the flask above the surface of the liquid charge. Heat is applied, and when the mixture reaches a temperature of 160° C., 977 cc. of ammonia per minute are passed into the clear light yellow solution by means of a gas dispersion tube. During a period of 6¼ hours, the temperature of the liquid charge slowly rises from 205° to 345° C. and the water which is released (total 460 ml.) is collected in the receiver and traps along with 70 ml. of an immiscible organic liquid. A total of 3.1 moles of ammonia per mole of dodecanedioic acid is used, representing an excess of 1.1 moles of ammonia per mole of diacid. The organic liquid is returned to the reaction flask and the whole is vacuum distilled. A total of 2131 gm. of pure, colorless dodecanedinitrile, B.P. 193° C./8 mm. Hg, is obtained. This corresponds to a recovery of 97.0% of the theoretical amount of dinitrile. Assuming complete recovery of the original dodecanedinitrile used as the reaction medium (a blank run showed 99.4% is recovered), a 93.1% yield of distilled, pure product is obtained. A dark brown residue amounting to 19.9 gm. remains undistilled.

EXAMPLE 2

Example 1 is repeated except that the ammonia is introduced into the liquid for 6.0 hours, and the reaction temperature is 140–330° C. The catalyst is 17.2 gm. of KH$_2$PO$_4$. Upon distillation, 1912 gm. (71.2% reaction yield) of pure colorless dodecanedinitrile are recovered.

EXAMPLE 3

Example 1 is repeated using an ammonia flow rate of 977 cc./min. for 6 hours and 50 minutes followed by 600 cc./min. for 4.5 hours for a total of 2.8 moles excess ammonia per mole of dodecanedioic acid at a temperature of 140–325° C. The catalyst is 21.6 gm. of

K$_2$HPO$_4$·3H$_2$O

After distillation, 1890 gm. (69.0% reaction yield) of pure colorless dodecanedinitrile are obtained.

EXAMPLE 4

Example 1 is repeated using an ammonia flow rate of 423 cc./min. for 0.75 hour, followed by 646 cc./min. for 6 hours, 50 minutes, for a total of 0.43 mole excess ammonia per mole of dodecanedioic acid. The charge includes 1800 gm. of dodecanedinitrile solvent and 24.0 gm. of Na$_3$PO$_4$·12H$_2$O as catalyst. After distillation, 2530 gm. (68.8% reaction yield) of pure colorless dodecanedinitrile are recovered.

EXAMPLE 5

Example 1 is repeated using the same ammonia flow rate but a reaction time of 6 hours, 50 minutes, and a temperature of 150–305° C. The charge is 1500 gm. of dodecanedioic acid, 1500 gm. of dodecanedinitrile solvent and 16.8 gm. of BPO$_4$ as catalyst. After distillation, 2648 gm. (91.6% reaction yield) of pure colerless dedocanedinitrile are recovered.

EXAMPLE 6

A reaction procedure similar to that of Example 1, having an ammonia flow rate estimated to be 200 ml./min. and a reaction time of 4 hours 5 min., and a temperature of 170–340° C., using 230 gm. (1.0 mole) of dodecanedioic acid, 345 gm. (1.745 mole) of dodecanedinitrile solvent, and 1.2 gm. of concentrated sulfuric acid as catalyst, affords, after distillation, 510 gm. (76.8% reaction yield) of pure colorless dodecanedinitrile.

EXAMPLE 7

Gaseous ammonia is added at 977 ml./min. for three hours and 5 minutes (total 8 moles—equal to two moles excess per mole of diacid) to a mixture of 460 gm. (2.0 mole) of dodecanedioic acid, and 460 gm. (2.396 mole) of dodecanedinitrile containing 2.3 gm. of 85% phosphoric acid at 160–320°. Subsequent vacuum distillation affords 815.0 gm. of pure colorless dodecanedinitrile (92.4% reaction yield).

EXAMPLE 8

A reaction using the same ammonia flow rate and reaction time as in Example 7 was run on 292 gm. (2.0 mole) of adipic acid in 216 gm. (2.0 mole) of adiponitrile containing 1.5 gm. of 85% phosphoric acid at 162–312°. Subsequent vacuum distillation affords 261.7 gm. of adiponitrile containing some partially converted material (21.1% reaction yield) and leaves 58.1 gm. of black resinous pot residue.

EXAMPLE 9

Example 8 is repeated with three modifications: (1) the amount of adiponitrile solvent used is 292 gm., (2) less strong heating (100–272°) is used in an attempt to reduce decarboxylative decomposition, (3) an additional 40 min. of ammonia treatment is given (total 10 moles—equal to three moles excess per mole of diacid) to attempt more complete conversion. Subsequent vacuum distillation affords 237.1 gm. of adiponitrile and 204.1 gm. of adiponitrile-plus-partially-converted product (in approximately 1:1 ratio) and leaves a pot residue of 31.4 gm. of black resin. A 37% reaction yield of adiponitrile and 47%, approximately, of partially converted adipic acid is obtained.

Reaction conditions or procedures more favorable for the production of adiponitrile may exist, but, as a comparison of Example 7 with Examples 8 and 9 shows, the process of the invention is clearly superior to the dehydrative amidation of adipic acid (i.e., the conversion of the carboxyl group to the nitrile group) under the conditions of these examples and permits a relatively complete conversion to high yield with a minimum amount of ammonia and reaction time.

I claim:
1. A process for producing dodecanedinitrile which comprises contacting a solution containing dodecanedioic acid, from 0.3 to 20 parts by weight of dodecanedinitrile per part of dodecanedioic acid and from 0.1 to 10% by weight based on the weight of dodecanedioic acid of a dehydrative amidation catalyst at a temperature in the range of 200 to 450° C. and under a pressure of 0.5 to 10 atmospheres with an excess of ammonia, the excess of ammonia being from about 0.2 to 3.0 moles per mole of dodecanedioic acid, removing gaseous by-products by distillation from the reaction mixture during the reaction, and thereafter recovering substantially pure dodecanedinitrile.

2. The process of claim 1 wherein the catalyst is of the group consisting of orthophosphoric acid, sodium, potassium and boron salts of orthophosphoric acid, and sulfuric acid.

3. The process of claim 2 wherein the final temperature of the solution is in the range of 315 to 345° C.

References Cited

UNITED STATES PATENTS

| | | | |
|---|---|---|---|
| 3,393,222 | 7/1968 | Schwarz et al. | 260—465.2 |
| 3,300,526 | 1/1967 | Kirsch | 260—465.2 |
| 3,299,116 | 1/1967 | Romani et al. | 260—465.2 |
| 2,788,362 | 4/1957 | Barnhart et al. | 260—465.2 |

JOSEPH P. BRUST, Primary Examiner

U.S. Cl. X.R.

260—465.8